UNITED STATES PATENT OFFICE.

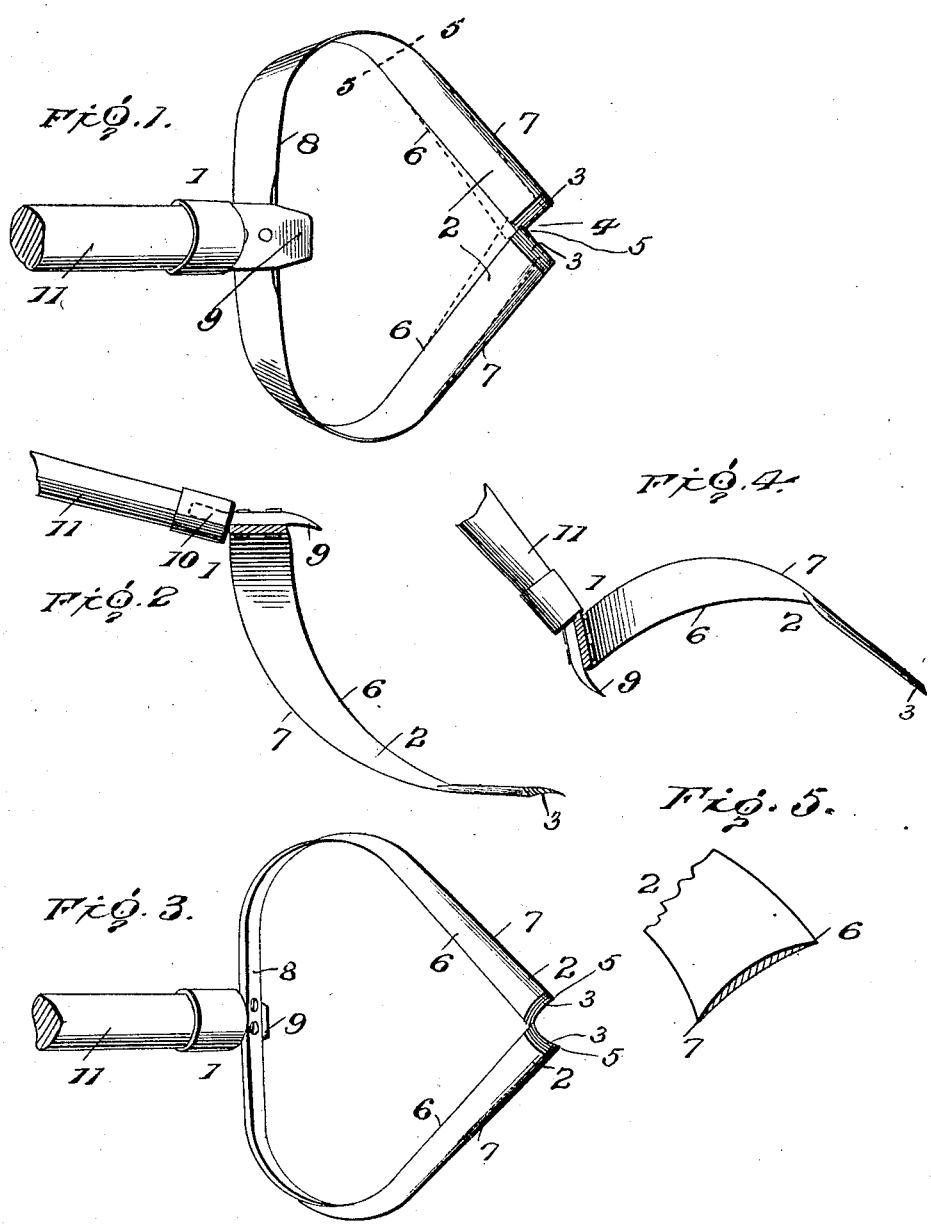

HUGH R. HILTON, OF PORT ALLEGANY, PENNSYLVANIA.

CULTIVATING-TOOL.

No. 870,957.　　　　Specification of Letters Patent.　　　　Patented Nov. 12, 1907.

Application filed March 11, 1907. Serial No. 361,857.

*To all whom it may concern:*

Be it known that I, HUGH R. HILTON, a citizen of the United States, residing at Port Allegany, in the county of McKean and State of Pennsylvania, have invented certain new and useful Improvements in Cultivating-Tools, of which the following is a specification.

The present invention provides a novel form of tool for cultivating the soil and which is formed from a blank or strip having its end portions inwardly curved and forwardly converged to form blades which are sharpened at opposite edges and made hollow or concave on their under sides, the ends of the blades coming together on a medial line and practically touching at their inner corners, and said blades having their ends straight, sharpened and flared to form a V-shaped space between them and two transversely spaced points. The middle portion of the blank or strip is sharpened on its inner, or forward edge only, and is supplied with a central blade pointing in the same direction as the converged blades and acting jointly therewith when the tool is reversed and used as a drag.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a plan view of an implement embodying the invention. Fig. 2 is a central longitudinal section thereof. Fig. 3 is a plan view of the implement reversed and used as a drag. Fig. 4 is a central longitudinal section of Fig. 3. Fig. 5 is a cross section of a blade.

Corresponding and like parts are referred to in the following description and indicated in all the views of the drawings by the same reference characters.

The tool or implement comprises body 1 and blades 2, said parts being formed from a blank or strip of steel bent into the shape substantially as shown, the middle portion of the strip forming the body 1 and the end portions being inwardly curved and forwardly converged to provide the blades 2. The ends of the strips are straight as indicated at 3 and are sharpened to form cutting edges and these cutting edges flare and form a V-shaped space 4 between them and points 5. The inner corners of the blades come together or touch and the under side of the blades is made hollow or concave. Opposite edges of the blades 2 are sharpened to provide inner cutters 6 and outer cutters 7. The body 1 has its forward edge 8 sharpened and is supplied at a central point with a blade 9 riveted or otherwise secured to the body and having a tang 10 to which a handle 11 is fitted. It is observed that the inner corners of the blades come together on a medial line and that the blade 9 and space 4 are in longitudinal alinement with the handle 11. The transversely spaced points 5 afford better control of the implement since they prevent side motion that is liable to occur in the forward thrust of a single-point hoe when it encounters harder soil on one side than on the other, and at the same time insure a balance whereby the operation of the implement is rendered more positive and easy since the points 5 and edges 3 more readily penetrate the soil and loosen the same. In the event of weeds entering the V-shaped space 4, the cutting edges 3 close slightly on the forward movement of the implement and sever the same by a shear cut and upon backward movement of the implement, the blades 2 open slightly, thereby permitting them to free and clear themselves of weeds, trash and the like. By making the blades 2 hollow, or concave, on their lower surfaces, a cutting edge is assured and the blades will bite into the soil more readily in either forward or backward stroke of the implement. This also obviates the tendency of all flat bladed scuffle hoes to wear on the under side because of great friction, thereby giving the edges a forward turn which tends to throw the hoe out of the ground or necessitates the handle being held at a steeper angle with loss of power.

The implement is reversible and when turned to bring the edges 6 and 8 lowermost, a valuable service is rendered in pulverizing the soil for a seed bed, also in working between rows of plants to loosen the soil and restore the dry earth mulch after rains, and at the same time uprooting all weeds growing between the rows. When reversed, the implement is used as a drag, that is, drawn backward instead of being pushed forward. The blade 9 cuts into the hard places and prepares the soil in advance of the points 5, thereby enabling the latter to sink more readily into the loosened track of the blade 9. This brings the edges of the points 5 and the edge 8 on each side of the blade 9 into service in moving the soil outward. It further insures deeper cultivation in the center of the tilled furrow between the plant rows, and shallow cultivation next to the plant rows, thus conforming to the natural root growth and at the same time avoiding root pruning.

It is further observed that the implement may be provided in various sizes and widths designed for farm, garden or nursery and that it may be used either with a handle as 11, or may be attached to either a wheel or horse implement.

Having thus described the invention, what is claimed as new is:

1. An implement comprising a strip having its end portions inwardly curved and forwardly converged to provide a body and blades, the latter terminating upon opposite sides of a medial line in cutting edges which are flared.

2. An implement comprising a strip having its end portions inwardly curved and forwardly converged to provide a body and blades, the latter terminating upon opposite sides of a medial line in cutting edges which are flared, the under side of said blades being hollow and both the front and rear edges of the blades being sharpened.

3. An implement consisting of a strip having its end portions inwardly curved and forwardly converged and terminating in flared cutting edges, the inner corners of the blades touching and said blades adapted to have a lateral springing movement to enable the flared cutting edges to operate by a shear action and the said blades to clear themselves of trash.

4. An implement comprising a strip having its end portions inwardly curved and forwardly converged to provide a body and blades which are in different planes, and a blade applied centrally to the said body and projecting in the same direction as the converged blades and in line with the space formed between said converged blades.

5. An implement formed of a strip having its end portions inwardly curved and forwardly converged to provide a body and blades, the latter terminating in diverged cutting edges and the blades having both their front and rear edges sharpened and the said body having its forward edge sharpened, and a blade projected forward from said body in the same direction as the aforesaid converged blades.

6. An implement comprising a strip having its end portions inwardly curved and forwardly converged to provide a body and blades, the latter being hollow upon their lower surfaces and terminating in flared cutting edges, both the front and rear edges of the blades being sharpened and the forward edge of said body being sharpened.

In testimony whereof I affix my signature in presence of two witnesses.

HUGH R. HILTON. [L. S.]

Witnesses:
F. C. RETZER,
W. E. SPRINGER.